United States Patent [19]
Smith

[11] Patent Number: 5,440,139
[45] Date of Patent: Aug. 8, 1995

[54] CIRCUIT FOR OPTICALLY COUPLING A CRYOBENIC DETECTOR ARRAY WITH PROCESSING CIRCUITRY AND FOR INCREASING THE DYNAMIC RANGE OF DETECTION

[75] Inventor: Roy A. Smith, Redondo Beach, Calif.

[73] Assignee: Grumman Aerospace Corporation, Bethpage, N.Y.

[21] Appl. No.: 206,741

[22] Filed: Mar. 2, 1994

[51] Int. Cl.[6] .............................................. G02B 27/00
[52] U.S. Cl. ................................. 250/551; 250/208.1; 250/352; 250/332
[58] Field of Search ...................... 250/551, 208.1, 332, 250/352, 330, 349, 338.1; 348/164, 165, 166, 167, 168

[56] References Cited

U.S. PATENT DOCUMENTS

| | | | |
|---|---|---|---|
| H1,354 | 9/1994 | Martinez | 250/352 |
| 4,328,516 | 5/1982 | Colpack et al. | 358/113 |
| 5,118,946 | 6/1992 | Smith | 250/352 |
| 5,151,588 | 9/1992 | Kiri et al. | 250/208.1 |
| 5,200,623 | 4/1993 | Cannata | 250/338.1 |
| 5,247,183 | 9/1993 | Tocci | 250/551 |
| 5,324,944 | 6/1994 | Soch et al. | 250/338.3 |
| 5,340,984 | 8/1994 | Evans | 250/332 |

*Primary Examiner*—David C. Nelms
*Assistant Examiner*—Steven L. Nichols
*Attorney, Agent, or Firm*—Stetina Brunda & Buyan

[57] ABSTRACT

A method for communicating a signal representative of an infrared detector element's output to electrically and thermally isolated signal processing circuitry utilizes the steps of: varying the reflectivity of a photoreflective cell in response to the output of the infrared detector element such that the reflectivity of the photoreflective cell is representative thereof; resetting the photoreflective cell when the reflectivity thereof reaches a predetermined value; optically scanning the photoreflective cell with an optical scanner which is electrically and thermally isolated from the photoreflective cell; and counting the number of times the photoreflective cell is reset so as to provide a signal representative of the infrared detector element's output.

12 Claims, 2 Drawing Sheets

CIRCUIT FOR OPTICALLY COUPLING A CRYOBENIC DETECTOR ARRAY WITH PROCESSING CIRCUITRY AND FOR INCREASING THE DYNAMIC RANGE OF DETECTION

FIELD OF THE INVENTION

The present invention relates generally to infrared detection circuits, and more particularly to a method and circuit for communicating signals from infrared detector elements to electronically and thermally isolated signal processing circuitry.

BACKGROUND OF THE INVENTION

The infrared spectrum covers a range of wavelengths longer than the visible wavelengths but shorter than microwave wavelengths. Visible wavelengths are generally regarded as between 0.4 and 0.75 micrometers. The near infrared wavelengths extend from 0.75 micrometers to 10 micrometers. The far infrared wavelengths cover the range from approximately 10 micrometers to 1 millimeter. The function of infrared detectors is to respond to energy of a wavelength within some particular portion of the infrared region.

Heated objects radiate thermal energy having characteristic wavelengths within the infrared spectrum. Different levels of thermal energy, corresponding to different sources of heat, are characterized by the emission of signals within different portions of the infrared frequency spectrum. No. single detector is uniformly efficient over the entire infrared frequency spectrum. Thus, detectors are selected in accordance with their sensitivity in the range of interest to the designer. Similarly, electronic circuitry that receives and processes the signals from the infrared detector must also be selected in view of the intended detection function.

A variety of different types of infrared detectors have been proposed in the art since the first crude infrared detector was constructed in the early 1800's. Virtually all contemporary infrared detectors are solid state devices constructed of materials that respond to infrared frequency energy in one of several ways. These include thermal detectors, photovoltaic detectors, and photoconductive detectors.

Thermal detectors respond to infrared energy detectors by absorbing that energy causing an increase in temperature of the detecting material. The increased temperature in turn causes some other property of the material, such as resistivity, to change. By measuring this change the infrared radiation is measured.

Photo-type detectors (e.g.,. photoconductive and photovoltaic detectors) absorb the infrared frequency energy directly into the electronic structure of the material, inducing an electronic transition which, in turn, leads to either a change in the electrical conductivity (photoconductors) or to the generation of an output voltage across the terminals of the detector (photovoltaic detectors). The precise change that is effected is a function of various factors including the particular detector material selected, the doping density of that material and the detector area.

By the late 1800's, infrared detectors had been developed that could detect the heat from an animal at one quarter of a mile. The introduction of focusing lenses constructed of materials transparent-to infrared frequency energy, as well as advances in semiconductor materials and highly sensitive electronic circuitry have advanced the performance of contemporary infrared detectors close to the ideal photon limit.

Current infrared detection systems incorporate arrays of large numbers of discrete, highly sensitive detector elements, the outputs of which are connected to sophisticated processing circuitry. By rapidly analyzing the pattern and sequence of detector element excitation, the processing circuitry can identify and monitor sources of infrared radiation. Though the theoretical performance of such systems is satisfactory for many applications, it is difficult to actually construct structures that mate a million or more detector elements and associated circuitry in a reliable and practical manner. Consequently, practical applications for contemporary infrared detection systems have necessitated that further advances be made in areas such as miniaturization of the detector array and accompanying circuitry, minimization of noise intermixed with the electrical signal generated by the detector elements, and improvements in the reliability and economical production of the detector array and accompanying circuitry.

Further difficulties are associated with conventional infrared detection systems designed for orbital use. Temperatures in space are extremely low. Though the detector elements may be designed to operate in a cryogenic environment, economic considerations may dictate that the associated processing circuitry operate in a higher temperature environment. The semiconductive materials and other elements incorporated into the processing circuit are typically more suited for room temperature operation. Where the detector circuitry is directly connected to the processing circuitry, it is difficult to thermally isolate the cryogenic detector circuit from-the room temperature processing circuitry. Connections communicating the signal interfaces, power supply connections, and other physical interconnections, typically effected by wires or metallized patterns, conduct heat and thereby transfers thermal conditions between the detector circuit and the processing circuitry. Moreover, such connections result in undesirable communication of noise and other transient signals between the detector circuit and the processing circuitry.

A problem commonly associated with circuits for interfacing detector elements with processing circuitry while isolating the detector elements and the related interface circuitry from the room temperature processing circuit is saturation of the photoreflective cell. Such saturation of the photoreflective cell results in lost signal information and thus provides incomplete and/or inaccurate data. As such, the dynamic range of the infrared detector elements is correspondingly limited by saturation of the photoreflective cell, thus substantially reducing the applications in which such infrared detector systems may be utilized.

One example of such a circuit for interfacing cryogenic detector arrays with processing circuitry so as to electrically and thermally isolate the infrared detector elements thereof from the signal processing circuitry is disclosed in U.S. Pat. No. 5,118,946, issued on Jun. 2, 1992 to Smith and entitled CIRCUIT FOR INTERFACING CRYOGENIC DETECTOR ARRAY WITH PROCESSING CIRCUIT, the contents of which are hereby incorporated by reference.

Thus, it would be beneficial to provide an optical coupler for infrared detection systems which is not subject to the detrimental effects of photoreflective cell saturation.

SUMMARY OF THE INVENTION

The present invention specifically addresses and alleviates the above-mentioned deficiencies associated with the prior art. More particularly, the present invention comprises a method and an optical coupler for communicating a signal representative of an infrared detector element's output to electrically and thermally isolated signal processing circuitry.

The method comprises the steps of varying the reflectivity of a photoreflective cell in response to the output of an infrared detector element such that the reflectivity of the photoreflective cell is representative thereof; resetting the photoreflective cell when the reflectivity of the photoreflective cell reaches a predetermined value; optically scanning the photoreflective cell with an optical scanner which is electrically and thermally isolated from the photoreflective cell; and counting the number of times the photoreflective cell is reset and then providing a signal representative of the infrared detector element's output based upon the count.

The reflectivity of the photoreflective cell preferably varies directly with the output of the infrared detector element, preferably such that the reflectivity is directly proportional thereto. Alternatively, the reflectivity of the photoreflective cell varies inversely with the output of the infrared detector element, preferably such that the reflectivity of the photoreflective cell is inversely proportional thereto.

The photoreflective cell is reset to its initial or minimum input signal reflectivity when the output of the infrared detector element is at predetermined value. Resetting of the photoreflective cell preferably occurs when the output of the infrared detector element reaches a value which corresponds to the maximum reflectivity of the photoreflective cell. However, in those instances where the reflectivity of the photoreflective cell varies inversely with the output of the infrared detector element, the photoreflective cell is preferably reset when the output of the infrared detector element reaches a predetermined value which corresponds approximately to the minimum reflectivity of the photoreflective cell.

The number of times the photoreflective cell is reset is counted by monitoring the output of the optically scanner utilizing a counting circuit.

Thus, the present invention provides a method and circuit for regulating the reflectivity of a photoreflective cell in a manner which facilitates the discrimination and quantification of the detector signal as measured by the optical scanning system over a substantially broader dynamic range of infrared sources. More particularly, the present invention provides a technique for resetting the photoreflective element each time the signal from the detector element reaches a predetermined threshold voltage. The scanning system counts the number of resets of the photoreflective element to determine the amplitude of the infrared signal received by the infrared detector elements. The number of resets will vary directly with the infrared detector element's output current, thereby facilitating a simple determination of the infrared source intensity.

These, as well as other, advantages of the present invention will be more apparent from the following description and drawings. It is understood that changes in the specific structure shown and described may be mad within the scope of the claims without departing from the spirit of the invention.

DETAILED DESCRIPTION OF THE PREFERRED EMBODIMENTS

The detailed description set forth below is intended merely as a description of the presently preferred embodiment of the invention, and is not intended to represent the only form in which the present invention may be constructed or utilized. The description below sets forth the functions and sequence of signals that are effected by the invention in accordance with the illustrated embodiment. It is to be understood, however, that the same or equivalent functions or signal sequences may be accomplished by different embodiments that are also intended to be encompassed within the spirit and scope of the invention.

Figure 1:
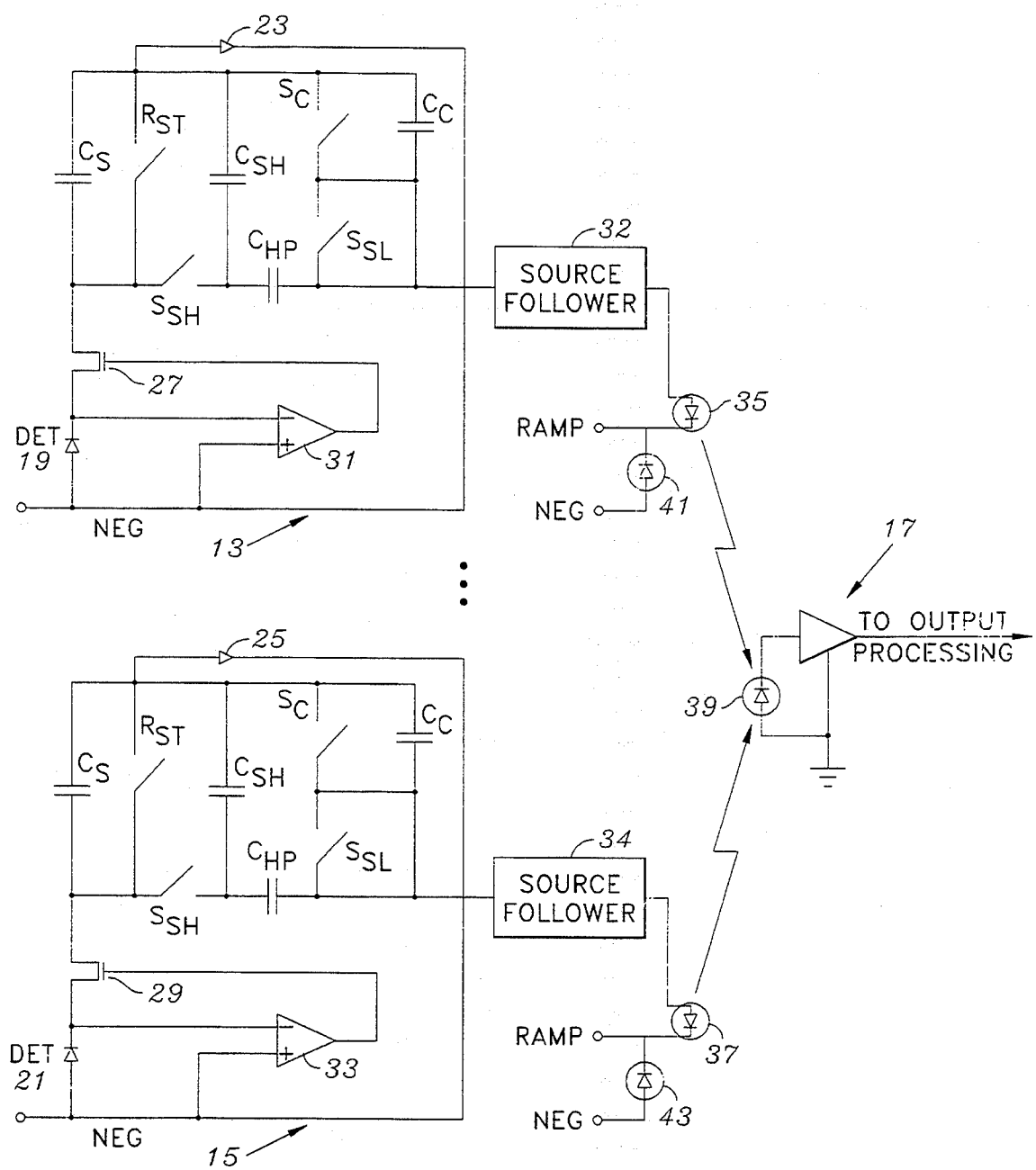
FIG. 1 is a schematic representation of a prior art circuit for communicating a signal-representative of an infrared detector element's output so as to electrically and thermally isolate the infrared detector elements from associated signal processing circuitry.

FIG. 1 of the drawings illustrates a circuit 11 formed in accordance with the prior art. The circuit includes detector sampling/comparing circuits 13 and 15, which are in communication with input circuit 17 connected to the processing electronics. The sampling/comparing circuits 13 and 15 are each connectable to a dedicated detector element 19, 21, respectively.

In implementation the sampling/comparing circuits 13, 15 may be repeated hundreds or thousands of times to accommodate the size of the detector array. The sampling/comparing circuits 13 and 15 may be incorporated into integrated circuits, each including a plurality of sampling/comparing circuits, mounted on substrates that are in electrical communication with the detector elements. The assemblies of detector subarrays and interconnected substrates may form detector modules which are disposed in adjacent, abutting relationship. Each module may in turn be in communication with the processing circuitry. The construction of such modules is well known in the art and is disclosed in the following references:

U.S. Pat. No. 3,582,714 CARSON ET AL.
U.S. Pat. No. 3,970,990 CARSON ET AL.
U.S. Pat. No. 4,283,755 TRACY
U.S. Pat. NO. 4,304,624 CARSON ET AL.
U.S. Pat. No. 4,352,715 CARSON ET AL.
U.S. Pat. No. 4,354,107 CARSON ET AL.
U.S. Pat. No. 4,103,238 CLARK
U.S. Pat. No. 4,525,921 CARSON ET AL.
U.S. Pat. No. 4,551,629 CARSON ET AL.
U.S. Pat. No. 4,592,029 ALTMAN ET AL.

U.S. Pat. No. 4,618,763 SCHIMITZ
U.S. Pat. No. 4,646,128 CARSON ET AL.
U.S. Pat. No. 4,659,931 SCHMITZ
U.S. Pat. No. 4,675,532 CARSON
U.S. Pat. No. 4,672,937 CARSON ET AL.

The teachings of the above-cited references are incorporated herein by reference. Though such modules may be found to operate in cryogenic environments, the associated processing circuitry include elements that are best suited to operating in an environment wherein the temperature is substantially in excess of cryogenic temperatures, often approximately room temperature. The present invention is directed to an interface circuit which may be incorporated into such modules or otherwise be used to interface such modules with processing circuitry that is electrically and thermally isolated from the cryogenic environment.

The prior art sampling/comparing circuits 13 and 15 operate as follows. The circuits 13, 15 are powered by means of solar energy or by a light source disposed adjacent the solar cells. Consequently, the circuit is thermally and electrically isolated from any electrical power source operating the processing circuitry.

Detector elements 19 and 21 are biased by transistors 27, 29 and offset stabilizing amplifiers, 31, 33. The circuits are initialized by closing the start switches $R_{ST}$. The output from the detector elements are sampled when the sample and hold switches $S_{SH}$ and $S_{SL}$ are closed. Capacitors CC are charged by closing switches $S_{SL}$ at the same time that switches $S_{SH}$ and $S_{SL}$ a charge is placed on capacitors $C_C$ and $C_{HP}$. That charge closely follows and is proportional to the integral of the detector output current. Source follower circuits 32, 34 produce an output which closely follows the output of the detectors 19 21. The source follower output is effectively compared to a reference signal, designated RAMP. The RAMP signal is connected to a comparitor circuit that drives light emitting diodes (LED's) 35, 37. The LED's will not generate an output light signal until such time as the RAMP signal exceeds the output signal from the source followers. At that time the LED's 35, 37 operate to generate a light signal that is communicated to photo detector 39, which forms a portion of the processing circuitry.

In order to further isolate the sampling/comparing circuit from the processing circuitry the RAMP signal may be generated external to the sampling/comparing circuitry and optically communicated to the circuit, thereby enhancing electrical and thermal isolation of the circuit. As shown at FIG. 1 the RAMP signal may be communicated to the LED's via photodiodes 41, 43 which are in electrical communication with the LED's 35, 37, respectively.

The RAMP signal is preferably implemented as a time varying signal having a predetermined start time in relation to the sampling of the detector output. In the presently preferred embodiment the RAMP signal is a linearly varying signal, though other signal patterns may be used within the broader aspects of the invention. The existence and amplitude of the detector output signal may therefore be determined by measuring the time delay between the initiation of the RAMP signal and the time at which the LED's 35, 37 are forward biased to generate an output light signal. Once a determinable light signal is generated by the LED's the amplitude of the detector output signal can be determined by reference to the time after start of the RAMP signal. Knowing the function of RAMP signal readily permits computation of the detector peak output signal.

It is contemplated that the LED's 35, 37 may be constructed to operate at different characteristic wavelengths. In such a manner a plurality of sampling/comparing circuits may generate simultaneous output signals which may be separately discernible by the processing circuitry and wavelength discriminating optical filters. Obviously, the photodetector 39 and other processing circuitry must be constructed to discern optical signals of discrete wavelengths in order to implement such an embodiment.

Figure 2:
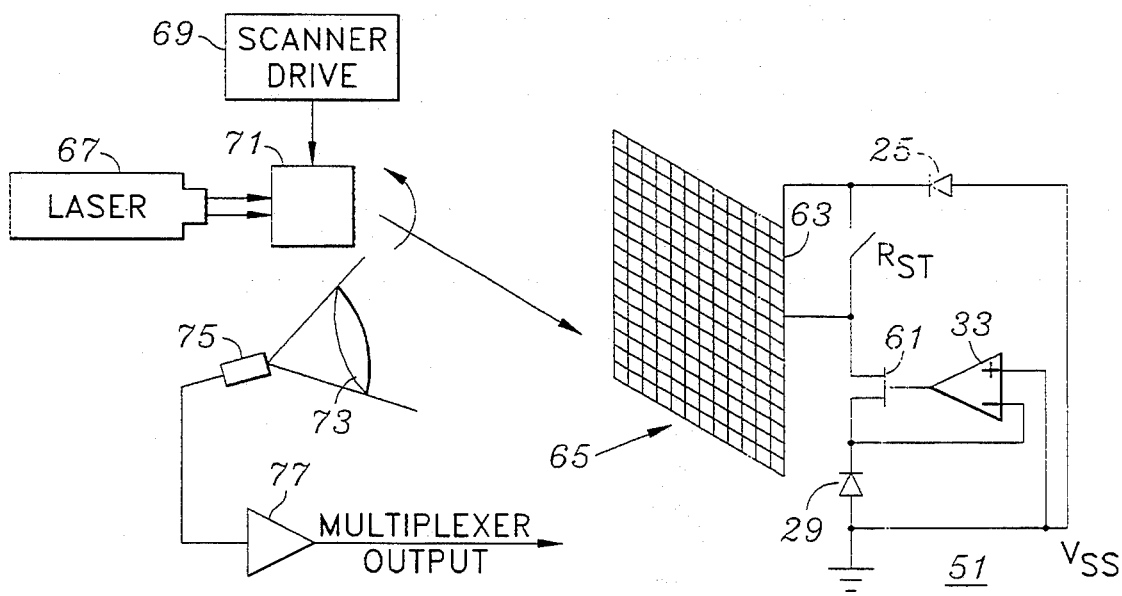
FIG. 2 is a schematic representation of an alternative circuit for communicating a signal representative of an infrared detector element's output to electrically and thermally isolate a signal processing circuitry.

FIG. 2 illustrates an alternate embodiment of the prior art device. In the embodiments shown at FIG. 2 the detector input circuit 51 is simplified and requires less power to operate. The embodiment shown at FIG. 2 incorporates a modified input circuit 51, shown in conjunction with other system components. As with FIG. 1 the detector element 61 is one of a large number of detector elements that form a detector subarray. The LCD or other display with electronically controlled reflectivity, 63 is also one element in array of LCD's that have reflectivity producing optical signals, representative of the detected input signal. The images on the reflectivity controlled subarray 65 may be scanned by means of laser 67, scanner drive 69 and laser beam scanner 71. Light collecting lens 73 communicates the image generated by laser beam scanning of the LCD array to a photodetector 75. The photodetector output is amplified by amplifier 77 and thereafter communicated to off-focal plane processing circuitry.

The operation of the input circuit 51 is as follows. The signal sensed by the individual detector element 29 is communicated to the associated cell in the array 63. All of the cells of 63 are illuminated by a light source such that the image appearing on the array 63 may be communicated to a corresponding detector element (not shown) connected to the output processing circuit and operating at room temperature. Accordingly, each detector element 29 has a corresponding LCD element 63 as well as transimpedance element 61, connected to the output processing.

Though the construction set forth at FIG. 2 incorporates additional imaging apparatus other than that set forth at FIG. 1 the economies are such that the cost and technical risks are reduced as a consequence of simplifying the on-focal plane circuitry, which must be designed to operate in a more extreme environment. As a consequence to the reduced consumption of power, the input circuit dissipates less heat and reduces thermal gradience in the input system that degrade the overall detection circuit.

Figure 3:
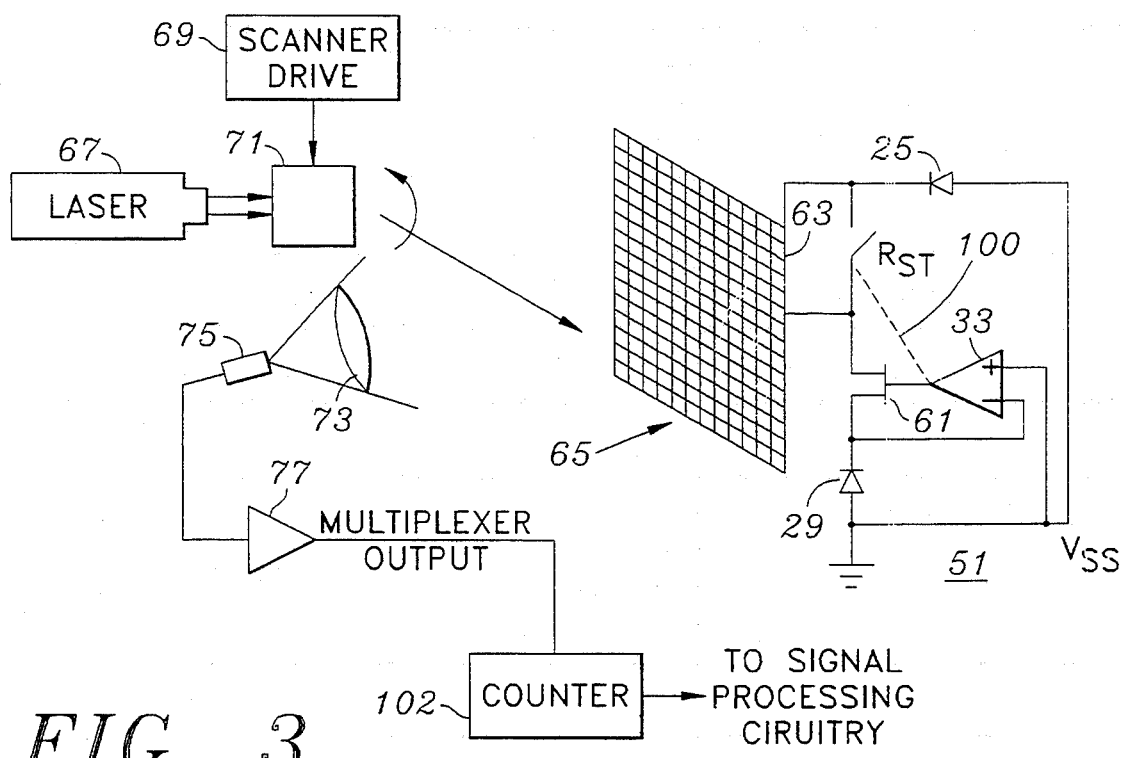
FIG. 3 is a schematic representation of a circuit for communicating a signal representative of an infrared detector element's output so as to electrically and thermally isolate the infrared detector elements from associated signal processing circuitry wherein the photoreflective cell is reset when the reflectivity thereof reaches a predetermined value and wherein the number of such resets is counted utilizing the output the optical scanner.

Referring now to FIG. 3, the present invention comprises an improvement to the above-discussed prior art device wherein the reset switch $R_{ST}$ is in communication via electrical connection 100 with amplifier 33 such that when the reflectivity of the photoreflective cell 63 reaches a predetermined value, corresponding to a particular output from the infrared detector element 29, the reset switch $R_{ST}$ closes, thus resetting the photoreflective cell, and thereby allowing it to again vary in reflectivity in response to further output from the infrared detector element 29.

A counter 102 receives the output of the photodetector 75 of the scanning circuit, typically via an amplifier 77. The counter 102 counts the number of cycles or resets of the photoreflective cell 63, thus determining the rough magnitude of the infrared detector element 29 output. To this rough magnitude is added the final level of the scanner output, which corresponds to the final reflectivity of the photoreflective cell during a particular cycle, thus accurately determining the intensity of the infrared source.

It is understood that the exemplary method and apparatus for communicating a signal representative of an infrared detector element's output to electrically and thermally isolated signal processing circuitry described herein and shown in the drawings represents only presently preferred embodiment of the invention. Indeed, various modifications and additions may be made to such embodiment without departing from the spirit and scope of the invention. For example, the reflectivity of the photoreflective cell may be caused to change in various different manners, i.e., linearly, exponentially, etc., so as to provide an input to the scanner which is representative of the infrared detector element's output. Also, those skilled in the art will recognize that various means for scanning such photoreflective cells are likewise suitable. Thus, these and other modifications may be obvious to those skilled in the art and may be implemented to adapt the present invention for use in a variety of different applications.

What is claimed is:

1. A method for communicating a signal representative of an infrared detector element's output to electrically and thermally isolated signal processing circuitry, the method comprising the steps of:
   (a) varying reflectivity of a photoreflective cell in response to the output of the infrared detector element such that the reflectivity of the photoreflective cell is representative thereof;
   (b) resetting the photoreflective cell when the reflectivity thereof reaches a predetermined value;
   (c) optically scanning the photoreflective cell with an optical scanner which is electrically and thermally isolated from the photoreflective cell; and
   (d) counting the number of times the photoreflective cell is reset to provide a signal representative of the infrared detector element's output.

2. The method as recited in claim 1 wherein the steps of varying the reflectivity of a photoreflective cell in response to the output of the infrared detector element comprises varying the reflectivity directly with the output of the infrared detector element.

3. The method as recited in Claim 2 wherein the step of resetting the photoreflective cell when the reflectivity thereof reaches a predetermined value comprises resetting the photoreflective cell when the reflectivity of the photoreflective cell is approximately its maximum value.

4. The method as recited in claim 1 wherein the steps of varying the reflectivity of a photoreflective cell in response to the output of the infrared detector element comprises varying the reflectivity inversely with the output of the infrared detector element.

5. The method as recited in claim 2 wherein the step of resetting the photoreflective cell when the reflectivity thereof reaches a predetermined value comprises resetting the photoreflective cell when the reflectivity of the photoreflective cell is approximately its minimum value.

6. The method as recited in claim 1 wherein the step of counting the numbers of times the photoreflective cell is reset comprises counting the number of times the photoreflective cell is reset by monitoring the output of the optical scanner.

7. An optical coupler for communicating a signal representative of an infrared detector element's output to electrically and thermally related signal processing directly, the optical couplers comprising:
   (a) a photoreflective cell;
   (b) a circuit for varying the reflectivity of the photoreflective cell such that the reflectivity varies in response to the output of the infrared detector element such that the reflectivity of the photoreflective cell is representative thereof;
   c) a resetting circuit for resetting the photoreflective cell when the reflectivity thereof reaches a predetermined value; and
   (d) an optical scanner for scanning the photoreflective cell, the optical scanner being electrically and thermally isolated from the photoreflective cell;
   (e) wherein the level of the infrared detector element output is determined by counting the number of times the photoreflective cell is reset and providing a signal representative of the infrared detector element output based upon the count.

8. The optical coupler as recited in claim 7 wherein the circuit for varying reflectivity of a photoreflective cell comprises a circuit for varying the reflectivity directly with the output of the infrared detector element.

9. The optical coupler as recited in claim 7 wherein the resetting circuit comprises a resetting circuit for resetting the photoreflective cell when the reflectivity thereof reaches a predetermined value comprises resetting the photoreflective cell is approximately its maximum value.

10. The optical coupler as recited in claim 7 wherein the circuit for varying the reflectivity of a photoreflective cell comprises a circuit for varying the reflectivity inversely with the output of the infrared detector element.

11. The optical coupler as recited in claim 7 wherein the resetting the photoreflective cell when the reflectivity thereof reaches a predetermined value comprises resetting the photoreflective cell is approximately two times its minimum value.

12. An optically coupled infrared detector imaging system, said system comprising:
   (a) a plurality of infrared detector elements generally defining an array;
   (b) a photoreflective cell or plurality of cells;
   (c) a circuit for varying the reflectivity of the photoreflective cell such that the reflectivity varies in response to the output of the infrared detector element such that the reflectivity of the photoreflective cell is representative thereof;
   (d) an resetting circuit for resetting the photoreflective cell when the reflectivity thereof reaches a predetermined value;
   (e) an optical scanner for scanning the photoreflective cell, the optical scanner being electrically and thermally isolated from the photoreflective cell; and
   (f) wherein the level of the infrared detector element output is determined by counting the number of times the photoreflective cell is reset and providing a signal representative of the infrared detector element output based upon the count.

* * * * *

UNITED STATES PATENT AND TRADEMARK OFFICE
CERTIFICATE OF CORRECTION

PATENT NO. : 5,440,139
DATED : August 8, 1995
INVENTOR(S) : Roy A. Smith

It is certified that error appears in the above-indentified patent and that said Letters Patent is hereby corrected as shown below:

Title page, item [54] and col. 1, line 2, in the Title: Delete "CRYOBENIC" and replace with --CRYOGENIC--.

Signed and Sealed this

Twenty-first Day of November, 1995

Attest:

BRUCE LEHMAN

Attesting Officer

Commissioner of Patents and Trademarks